United States Patent Office 3,112,339
Patented Nov. 26, 1963

3,112,339
PROCESS FOR THE MANUFACTURE AND RECOVERY OF A CHLORINE-CONTAINING CARBOXYLIC ACID
Richard H. Kimball, Lewiston, and George W. Darling, Youngstown, N.Y., assignors to Hooker Chemical Corporation, Niagara Falls, N.Y., a corporation of New York
No Drawing. Filed Mar. 11, 1960, Ser. No. 14,174
10 Claims. (Cl. 260—514)

This invention relates to the manufacture of chlorendic acid, and is more particularly concerned with making chlorendic acid having desirable purity and color characteristics. Chlorendic acid, also known as hexachloroendomethylene tetrahydrophthalic acid, is 1,4,5,6,7,7-hexachlorobicyclo - (2.2.1) - 5-heptane-2,3-dicarboxylic acid, and in this specification, will be referred to as "chlorendic acid" for brevity.

This is a continuation-in-part of an application S.N. 580,725, filed April 26, 1956, now abandoned.

According to the prior art, the anhydride of chlorendic acid is formed by the reaction of hexachlorocyclopentadiene and maleic anhydride in refluxing xylene solution and is described in United States Letters Patent 2,606,910, issued to Herzfeld et al. Chlorendic acid, the product formed from the hydrolysis of the anhydride, is a dibasic acid containing a large amount of stable chlorine and has found use on a commercial scale for preparing fire-resistant polyester resins.

Insofar as applicants have ascertained, only one method has been described in the prior art for the preparation of chlorendic acid, namely, by Prill, JACS 69, 62 (1947). In this method, hexachlorocyclopentadiene and maleic anhydride were reacted in toluene to form the adduct. Unreacted hexachlorocyclopentadiene and toluene were removed by steam distillation. The dicarboxylic acid resulting from hydrolysis of the adduct was mostly in the form of a heavy oil layer in the distillation residue (about 1500 milliliters of water), and crystallized on cooling to room temperature. It is stated that the product was purified by recrystallization from water or toluene. No data on yield or purity of the product are given. While this method produces chlorendic acid, many disadvantages prevent adoption of this method for large scale commercial production of such product.

Chlorendic acid prepared by the method described in the prior art has undesirable color charactertistics which preclude its use in making high-grade, light-colored, polyester resins. In addition, when operating according to the procedure of Prill, steam distillation of the reaction mixture containing the product must be continued for an uneconomically long time if any effort is made to remove all the unreacted hexachlorocyclopentadiene. The diene has a very strong unpleasant odor and unless the diene is removed, it will impart undesirable characteristics to the acid product. Repeated recrystallization by mehods known to the prior art improves the color only very slowly, and is accomplished by loss of yield and increasing complexity for satisfactory commercial application.

It is among the principal objects of this invention to provide a method for the production and recovery of chlorendic acid which is direct and simple and which is readily adaptable to large-scale commercial operation. A further object is to provide a method for the production and recovery of chlorendic acid where the product obtained is suitable for the manufacture of high-grade, light-colored polyester resins. Other objects will become apparent to those skilled in the art on consideration of the complete specification and claims.

We have now found a new and useful method for making chlorendic acid of light color and high purity suitable for the manufacture of high-grade, light-colored polyester resins and in which the product is obtained in high yield by a simple and direct process involving crystallizing said chlorendic acid from a substantially immiscible solvent pair consisting of water and an organic solvent, selected from the group consisting of hydrocarbon solvents, halogenated hydrocarbon solvents, ether solvents, ethylacetate, thiophene solvents, organic sulfide solvents, nitroparaffin solvents and mixtures thereof, followed by filtration, washing of the crystals with the solvents, and drying the crystals so formed. More particularly, the process involves recovering chlorendic acid from a reaction mixture containing chlorendic anhydride by mixing the reaction mixture with a solvent pair consisting of water in excess of the amount required to hydrolyze the anhydride adduct, plus an organic solvent substantially immiscible with water; holding at an elevated temperature long enough to hydrolyze the anhydride adduct to chlorendic acid; separating the crystals so produced from the filtrate, as by filtration or centrifuging; washing the crystals both with the organic solvent and with water; and drying the crystals to remove the residual solvents. Chlorendic acid is thus recovered in high yield analyzing over ninety-nine percent purity and with a color suitable for making light-colored, high grade polyester resins.

The color of the chlorendic acid product was determined by the following procedure: Thirty grams of acid were dissolved in seventeen milliliters of acetone and the color of the solution was determined in an instrument such as the Taylor Water Analyzer, by comparison of the acid solution with Hazen (American Public Health Assn.) standards reading from 0 to 70. For colors darker than 70 the solution was diluted and the reading was multiplied by the appropriate factor.

The following examples illustrate our invention, but it is to be understood that the specific details given in the examples have been chosen for the purpose of illustration and are not intended to limit our invention except as defined in the appended claims.

*Example 1*

Two hundred and sixty-two grams (0.93 mole) of hexachlorocyclopentadiene (ninety-seven percent purity) was placed in a round-bottom reaction flash provided with a reflux condenser, agitation and heating and/or cooling means. Then, ninety grams (0.92 mole) of maleic anhydride dissolved in forty-five grams of monochlorobenzene was added slowly to the flask over a two hour period while maintaining the temperature of the resultant mixture between one hundred and thirty-five and one hundred and forty degrees centigrade. On completion of this addition, the temperature of the reaction mixture was raised and maintained between one hundred and forty and one hundred and fifty degrees centigrade for eight hours to complete the condensation reaction.

On completion of this reaction additional monochlorobenzene solvent (twenty-seven grams) was added to the reaction flask. The resultant liquid reaction mixture, containing chlorendic anhydride equivalent to a theoretical yield of three hundred and fifty-eight grams of chlorendic acid was cooled to a temperature of eighty degrees centigrade. Then, this mixture was added, slowly, to two hundred and seventeen grams of water maintained at a temperature of eighty degrees centigrade and contained in a round-bottom flask provided with agitation and heat and/or cooling means. Some cooling was required during the addition to maintain the reaction temperature between eighty-five and ninety degrees centigrade. The hydrolysis of the chlorendic anhydride to chlorendic acid is brisk in this temperature range. After this addition was completed the mixture, consisting of a lower oil layer and an upper aqueous layer, was agitated for one-half hour while maintaining the temperature as stated to insure completion of the hydrolysis.

While agitating the contents of the flask, said contents were cooled and chlorendic acid monohydrate crystallized out mainly at a temperature between thirty-nine and thirty-five degrees centigrade. Finally, the resultant slurry was cooled to a temperature of about twenty degrees centigrade and maintained at this temperature for fifteen minutes while continuing the agitation.

The chlorendic acid crystals, containing one mole of water of crystallization per mole of chlorendic acid, were suction filtered on a Buchner funnel. The filtrate consisted of two phases, a monochlorobenzene layer weighing fifty-nine grams and a water layer weighing one hundred and forty-two grams. Analysis of the monochlorobenzene and the water layer indicated 1.5 and 4.6 grams of dissolved impurities, respectively. The crystals were washed once with sufficient monochlorobenzene to cover them. The resultant filtrate consisted of a monochlorobenzene layer of one hundred and six grams, containing 2.6 grams of soluble impurities and a water layer of eleven grams. The washing step was repeated with a second portion of monochlorobenzene and resulted in ninety-seven grams of a filtrate consisting of a monochlorobenzene layer of 92.5 grams containing 0.9 gram of soluble impurities, and a water layer of 4.5 grams. The combined water layers from the first and second monochlorobenzene washes contained 0.75 gram of soluble impurities. The crystals obtained on the funnel after the second monochlorobenzene wash were determined to have a Hazen color of seventy.

Then, these crystals were washed in the same manner with one hundred grams of water. The resultant filtrate consisted of a water layer (ninety-six grams) containing 1.3 grams of water-soluble impurities, and ten grams of a monochlorobenzene layer. The crystals obtained on the funnel were determined to have a Hazen color of thirty. These crystals were then given a second wash with one hundred grams of water. The filtrate consisted of a water layer (one hundred and three grams) containing 0.4 gram of water-soluble impurities and 2.4 grams of a monochlorobenzene layer. The combined monochlorobenzene layers from the first and second water washes weighed 12.4 grams and contained 0.1 gram of monochlorobenzene soluble impurities. The crystals obtained after the second water wash were determined to have a Hazen color of fifteen. These crystals were dried in air and then dried for an hour at a temperature between one hundred and one hundred and five degrees centigrade to remove the water of hydration. The product, three hundred and twenty-two grams (ninety percent yield) of chlorendic acid analyzed 99.6 percent pure.

Example 1 illustrates a preferred embodiment of the process of this invention and demonstrates several important factors as follows: (1) The water phase and the organic solvent phase of the mother liquor each removes impurities soluble in that phase. (2) Washing with both solvents is necessary to produce a light-colored product. (3) The total of dissolved impurities including any dissolved chlorendic acid in the combined filtrate and washes was 12.15 grams, an amount which is one 3.4 percent of the theoretical yield of chlorendic acid. Therefore, by the process of this invention, a high yield of chlorendic acid is obtained without the necessity of recovering the product from the filtrates with its attendant complications.

*Example 2*

*Part A.*—A hot (seventy-five degrees centigrade) solution of five hundred and forty-six grams of maleic anhydride in two hundred and sixty-three grams of monochlorobenzene was added to one thousand, five hundred and sixteen grams of hexachlorocyclopentadiene over a two hour period. The hexachlorocyclopentadiene had been heated to one hundred and forty-five degrees centigrade before starting the addition and the temperature was then maintained at one hundred and forty-five plus or minus five degrees centigrade during the two hour addition period and for eight hours longer to complete the condensation. The batch was then cooled to one hundred and thirty degrees centigrade and known amounts were poured into two glass pans to crystallize. As soon as crystallization was completed one portion of cake was weighed to determine the loss of monochlorobenzene, which was thirteen percent of that originally present. This cake was then broken up and sealed in a jar to prevent further loss of monochlorobenzene.

*Part B.*—A two hundred gram sample of condensation product prepared as in Part A and containing the theoretical equivalent of 184.4 grams of chlorendic acid and 22.1 grams of monochlorobenzene was hydrolyzed by charging the material into a mixture of 43.7 grams of water and 84.4 grams of monochlorobenzene while being stirred and maintained at eighty-five degrees centigrade. This combination of materials provided 8.2 grams of water for hydrolysis and produced a solvent medium of 36.5 grams of water and 106.5 grams of monochlorobenzene for later crystallization. After stirring the one-phase system at eighty-five to ninety degrees centigrade for one-half hour to assure complete hydrolysis, the batch was crystallized by cooling. The batch was seeded successfully at forty-four degrees centigrade with the major part of the crystallization occurring at forty-two to 43.5 degrees centigrade. Finally the batch was cooled to twenty-five degrees centigrade. After stirring for fifteen minutes at twenty-five degrees centigrade the batch was filtered on a Buchner funnel giving a two-phase liquid filtrate. After washing with two fifty milliliter portions of monochlorobenzene, the product had a color of eighty (Hazen). The remaining cake was then washed with two fifty milliliter portions of H$_2$O. The product now had a color of thirty Hazen. After air-drying overnight at room temperature, the product was oven-dried to constant weight in two hours at one hundred and five degrees centigrade. The oven-dried material analyzed 99.20 percent chlorendic acid and had a color of thirty Hazen. The yield, after allowing for samples removed for color tests, was 96.6 percent of theory.

*Example 3*

Similarly, another two hundred gram sample of condensation product prepared in a manner after Example 2, Part A, was hydrolyzed and crystallized from a solvent medium consisting of 116.4 grams of water and 25.6 grams of monochlorobenzene. This 25.6 grams of monochlorobenzene, comprising 22.1 grams in the two hundred gram sample of condensation product charged and 3.5 grams added to correct for the loss during the crystallization step of Example 2, Part A, is the proportionate amount of monochlorobenzene present in the batch at the end of the condensation step. After filtering and washing with two sixty milliliter portions of monochlorobenzene, the wet cake had a color of seventy (Hazen). The remaining cake was then washed with two sixty milliliter portions of water. The resulting wet cake tested thirty (Hazen). After air-drying at room temperature overnight and oven-drying to constant weight at one hundred and five degrees centigrade, the product analyzed 99.3 percent chlorendic acid and had a color of thirty-five (Hazen). The yield was 97.0 percent of theory.

Examples 2 and 3 illustrate the process of this invention wherein chlorendic acid is crystallized from a substantially immiscible solvent pair consisting of water and monochlorobenzene and wherein the ratio of water to organic solvent is varied.

*Example 4*

Similarly, a two hundred grams sample of condensation product, prepared in a manner after Example 2, Part A, was hydrolyzed and then crystallized from a solvent medium consisting of 35.5 grams of monochlorobenzene and 106.5 grams of water. After filtering on a Hirsch funnel, the wet unwashed cake had a color of one hundred and thirty (Hazen). The cake was washed by an intimately mixed medium consisting of one hundred and thirty milliliters of monochlorobenzene and one hundred and thirty milliliters of water. The wash was applied from a shaker-top wash bottle at such a rate that there was no free-standing liquid above the surface of the cake at any time during the washing procedure. Vacuum was applied to the cake continuously during the washing operation. The washed wet cake had a color of thirty (Hazen). After air-drying at room temperature overnight and then oven-drying to constant weight for two hours at one hundred and five degrees centigrade, the product analyzed 99.59 percent chlorendic acid and had a color of fifty (Hazen). The yield was 97.0 percent of theory.

Example 4 illustrates the use of an intimately mixed medium consisting of water and an organic solvent, namely monochlorobenzene, in the washing step after crystallizing from the same medium.

The following Examples 5 to 12 are given to further illustrate our invention and specifically show the use of other organic solvents which may be used with water as the solvent pair to crystallize the desired product but it is to be understood that the specific solvents given in the examples have been chosen for the purpose of illustration and are not intended to limit our invention except as defined in the appended claims.

In particular, Examples 5, 6 and 7 illustrate the crystallization of chlorendic acid from a substantially immiscible solvent pair consisting of water and an organic solvent wherein the organic solvent consists of benzene, carbon tetrachloride, and perchloroethylene in the presence of monochlorobenzene.

*Example 5*

Another two hundred grams sample of condensation product, prepared in a manner after Example 2, Part A, was hydrolyzed by charging the material into ninety-nine grams of water being stirred at eighty-five degrees centigrade. After completion of the hydrolysis the batch was cooled to seventy-seven degrees centigrade and 25.6 grams of benzene were added to provide a crystallizing medium consisting of 80.9 grams of water, 25.6 grams of benzene and 25.6 grams of monochlorobenzene. The batch was crystallized by cooling. Although the bath was successfully seeded at forty-five degrees centigrade, the major part of the crystallization took place at thirty-five to thirty-seven degrees centigrade. After cooling to twenty-five degrees centigrade for fifteen minutes in the usual manner, the batch was filtered on a Buchner funnel. After washing with two sixty milliliter portions of benzene, the wet cake had a color of seventy (Hazen). The remaining cake was then washed with two sixty milliliter portions of water giving a wet cake with a color of thirty (Hazen).

After drying in the usual manner, the finished product analyzed 99.22 percent chlorendic acid and had a color of twenty-five (Hazen). The yield was 97.0 percent of theory.

*Example 6*

Similarly, another two hundred gram sample of condensation product, prepared in a manner after Example 2, Part A, was hydrolyzed and after cooling to seventy-five degrees centigrade carbon tetrachloride was added to provide a crystallizing medium consisting of 80.9 grams of water, 25.6 grams of carbon tetrachloride and 25.6 grams of monochlorobenzene. The batch was then crystallized by cooling. Although the batch was seeded successfully at forty-five degrees centigrade, the major part of the crystallization occurred at thirty-seven to forty degrees centigrade. After cooling to twenty-five degrees centigrade for fifteen minutes the batch was filtered on a Buchner funnel. After washing with two sixty milliliter portions of carbon tetrachloride, the wet cake had a color of seventy (Hazen). The remaining cake was then washed with two sixty milliliter portions of water. The water-washed cake tested thirty (Hazen). After drying in the usual manner, the final product analyzed 99.38 percent chlorendic acid and had a color of thirty-five (Hazen). The yield was 98.1 percent of theory.

*Example 7*

Similarly, another two hundred grams portion of condensation product, prepared in a manner after Example 2, Part A, was hydrolyzed and crystallized from a medium consisting of 80.9 grams of water, 25.6 grams of perchloroethylene and 25.6 grams of monochlorobenzene. Although the batch was successfully seeded at forty-five degrees centigrade, the major part of the crystallization occurred at thirty-nine to forty-one degrees centigrade. After completing the crystallization step in the usual manner, the batch was filtered on a Buchner funnel and the cake washed with two sixty milliliter portions of perchloroethylene. The wet cake had a color of seventy (Hazen). The remaining cake was then washed with two sixty milliliter portions of water. This cake had a color of thirty-five (Hazen). After drying in the usual manner, the product analyzed 99.16 percent chlorendic acid and had a color of forty (Hazen). The yield was 98.7 percent of theory.

*Example 8*

*Part A.*—A portion of the cake prepared as in Example 2, Part A, was crushed with a porcelain spatula and allowed to air-dry at room temperature to constant weight. The crystals were stirred frequently during the drying period. The loss in weight was equivalent to 97.0 percent of the amount of monochlorobenzene known to be present in the starting material. The air-dried condensation product had a color of three hundred and sixty (Hazen).

*Part B.*—A one hundred and eighty-two gram portion of this air-dry product was charged into 114.2 grams of water being stirred at eighty-five degrees centigrade. Upon completion of the hydrolysis and cooling to seventy-five degrees centigrade carbon tetrachloride was added to provide a crystallizing medium consisting of thirty-six grams of carbon tetrachloride and one hundred and six grams of water. The batch was crystallized by cooling. Although the batch was seeded successfully at forty-five degrees centigrade, the major part of the crystallization occurred at thirty-nine to 41.5 degrees centigrade. After cooling to twenty-five degrees centigrade and stirring at twenty-three to twenty-five degrees centigrade for fifteen minutes the batch was filtered on a Buchner funnel. The unwashed cake had a color of two hundred and twenty (Hazen). After washing with two sixty milliliter portions of carbon tetrachloride the wet cake had a color of ninety (Hazen). The remaining cake was then washed with two sixty milliliter portions of water giving a cake with a color of forty (Hazen). After drying in the usual manner, the final product analyzed 99.4 percent chlorendic acid and had a color of forty-five (Hazen). The yield was 97.8 percent of theory.

Example 9

Another one hundred and eighty-two gram portion of the air-dried condensation product prepared as in Example 8, Part A, was hydrolyzed in water solution and after cooling to seventy-five degrees centigrade, benzene was added to provide a crystallizing medium consisting of thirty-six grams of benzene and one hundred and six grams of water. The batch was crystallized in the regular manner. Although the batch was successfully seeded at thirty-seven degrees centigrade, the major part of the crystallization occurred at 34.5 to thirty-six degrees centigrade. After cooling to twenty-five degrees centigrade and stirring at twenty-four to twenty-five degrees centigrade for fifteen minutes the batch was filtered on a Buchner funnel. The unwashed cake had a color of one hundred and eighty (Hazen). After washing with two sixty milliliter portions of benzene, the wet cake had a color of ninety (Hazen). Upon washing with two sixty milliliter portions of water, the cake then had a color of twenty-five (Hazen). After drying in the usual manner, the final product analyzed 99.7 percent chlorendic acid and had a color of thirty-five (Hazen). The yield was 96.2 percent of theory.

Example 10

Another one hundred and eighty-two gram portion of the air-dried condensation product prepared as in Example 8, Part A, was hydrolyzed in water solution and after cooling to seventy-five degrees centigrade, nitromethane was added to provide a crystallizing medium consisting of thirty-six grams of nitromethane and one hundred and six grams of water. The batch was crystallized in the usual manner. Although the batch was successfully seeded at eighteen degrees centigrade the major part of the crystallization occurred at fifteen to sixteen degrees centigrade. After stirring fifteen minutes at ten to eleven degrees centigrade the batch was filtered on a Buchner funnel. After washing first with nitromethane and then with water the cake was dried in the usual manner giving a product with a color of forty (Hazen) and testing 99.92 percent chlorendic acid. Due to the solubility of wet chlorendic acid in nitromethane, the yield was 21.0 percent of theory.

Example 11

Another one hundred and eighty-two gram portion of the air-dried condensation product prepared as in Example 8, Part A, was hydrolyzed in water solution and after cooling to seventy-five degrees centigrade n-butyl ether was added to provide a crystallizing medium consisting of thirty-six grams of n-butyl ether and one hundred and six grams of water. The batch was crystallized in the usual manner. Although the batch was successfully seeded at thirty-eight degrees centigrade the major part of the crystallization occurred at thirty to thirty-two degrees centigrade. After stirring at twenty to twenty-two degrees centigrade for fifteen minutes the batch was filtered on a Buchner funnel. After washing first with n-butyl ether and then with water the cake was dried in the usual manner giving a product with a color of fifty (Hazen) and testing 100.14 percent chlorendic acid. Due to the solubility of wet chlorendic acid in n-butyl ether, the yield was 37.4 percent of theory.

Example 12

Another one hundred and eighty-two gram portion of the air-dried condensation product prepared as in Example 8, Part A, was hydrolyzed in water solution and after cooling to seventy-five degrees centigrade thiophene was added to provide a crystallizing medium consisting of thirty-six grams of thiophene and one hundred and six grams of water. The batch was crystallized in the usual manner. Although the batch was successfully seeded at thirty-eight degrees centigrade the major part of the crystallization occurred at twenty-nine to thirty-two degrees centigrade. After stirring at twenty to twenty-one degrees centigrade for fifteen minutes the batch was filtered on a Buchner funnel. After washing first with thiophene and then with water the cake was dried in the usual manner giving a product with a color of thirty-five (Hazen) and testing 99.61 percent chlorendic acid. The yield was 95.0 percent of theory.

Example 13

A two hundred and seventy-three gram sample of air-dried condensation product, prepared as in Example 8, Part A, was hydrolyzed in two hundred and twenty-seven milliliters of water at eighty-five degrees centigrade, and then cooled with agitation and seeding to crystallize out the chlorendic acid monohydrate. Although the batch was successfully seeded at fifty-six degrees centigrade, the major part of the crystallization occurred at fifty-three to fifty-four degrees centigrade. After cooling to twenty-five degrees centigrade and stirring at twenty-three to twenty-five degrees centigrade for fifteen minutes, the batch was filtered on a Buchner funnel. The unwashed cake had a color of three hundred and fifteen (Hazen). After washing with two one hundred milliliter portions of water the cake had a color of two hundred and seventy (Hazen). The cake was then recrystallized from two hundred and ten milliliters of water. After cooling to twenty-five degrees centigrade, filtering and washing with two one hundred milliliter portions of water, the wet product still had a color of two hundred and seventy (Hazen). This materal was recrystallized again from two hundred and ten milliliters of water following the same procedure. The washed product now had a color of two hundred and forty (Hazen). The odor plainly indicated that the product was still contamined by hexachlorocyclopentadiene and other impurities. Thus, after three crystallizations from water, the product was still unsatisfactory for use.

Example 14

Two hundred and seventy-two (272) grams of the condensation product of hexachlorocyclopentadiene and maleic anhydride, prepared as in Example 2, and containing chlorendic anhydride (0.63 moles) equivalent to a theoretical yield of two hundred and forty-six grams of chlorendic acid, was added to one hundred and sixty-seven grams of additional monochlorobenzene (total present—one hundred and ninety-eight grams) and 14.3 grams (0.79 moles) of water, which is twenty-five percent in excess of the theoretical amount needed to hydrolyze the chlorendic anhydride to chlorendic acid. The resultant mixture was maintained at a temperature of ninety to ninety-five degrees centigrade, with agitation, for one hour to complete hydrolysis, while a considerable amount of chlorendic acid crystals were formed. The slurry was cooled to twenty degrees centigrade with stirring and held at this temperature for fifteen minutes. The crystals of chlorendic acid were filtered off with suction. The filtrate was clear and a separate aqueous phase was not present.

The crystals were washed with two one hundred gram portions of monochlorobenzene. The combined filtrate and washings contained 4.4 grams of dissolved material, equivalent to only 1.8 percent of the theoretical yield of chlorendic acid. The washed crystals of chlorendic acid had a color of two hundred and twenty (Hazen).

Example 13 shows that attempted purification of chlorendic acid by crystallization from water alone is unsuccessful. Example 14 shows that attempted purification of chlorendic acid by crystallization from monochlorobenzene alone, containing only a twenty-five percent excess of water over that required in hydrolyzing the chlorendic anhydride to chlorendic acid, is equally unsuccessful, because the amount of excess water present in the crystallization medium is too small to form an effective solvent pair with the monochlorobenzene. Therefore, it is apparent that the conventional procedures widely employed in the prior art for the purification of organic compounds, namely crystallization from a single solvent followed by washing with the same solvent, produces chlorendic acid of a quality unsatisfactory for the manufacture of high-grade, light-colored polyester resins. Therefore, it is indeed surprising that contrary to normal crystallization practice wherein a product is purified from a single solvent that crystallization from a substantially immiscible solvent pair consisting of water and an organic solvent, provides chlorendic acid satisfactory for the commercial manufacture of high grade, light-colored polyester resins.

*Example 15*

Nineteen hundred (1,900) pounds (6.8 pound-moles) of hexachlorocyclopentadiene was charged into a five hundred gallon glass-lined reactor provided with a reflux condenser, agitations, and means for heating and cooling. The temperature was raised to one hundred and forty to one hundred and forty-five degrees centigrade, and a molten mixture of six hundred and eighty-five pounds (7.0 pound-moles) of maleic anhydride and forty-six gallons (four hundred and twenty pounds) of monochlorobenzene was gradually charged into the reactor over an extended period of 1.5 to three hours, while maintaining the reactants at one hundred and forty to one hundred and forty-five degrees centigrade. On completion of the addition, the feed lines were flushed with ten gallons (ninety-two pounds) of monochlorobenzene. The reactor was maintained at the above temperature for eight hours, to complete the reaction, and then twenty gallons (one hundred and eighty-four pounds) more monochlorobenzene was added.

One hundred seventy (170) gallons (fourteen hundred pounds) of water was placed in the crystallizer, a five hundred gallon glass-lined kettle provided with a means for agitation and controlled heating and cooling. The temperature of the water was raised to eighty degrees centigrade, and the content of the reactor was transferred to the crystallizer at a controlled rate, while holding the temperature of the crystallizer at eighty-three to ninety degrees centigrade. In this temperature range the hydrolysis of chlorendic anhydride to chlorendic acid is brisk. When the transfer was complete the transfer line was flushed with fifteen gallons (one hundred and forty pounds) of monochlorobenzene. The temperature of the crystallizer was maintained at eighty-three to ninety degrees centigrade for ten minutes, to complete the hydrolysis.

The crystallizer now contained a theoretical quantity of two thousand, six hundred pounds (6.8 pound-moles) of chlorendic acid, dissolved in a solvent pair consisting of ninety-one gallons (eight hundred and thirty-six pounds) of monochlorobenzene and one hundred and seventy gallons (fourteen hundred pounds) of water. On cooling with agitation crystals of chlorendic acid monohydrate separated, mostly in the temperature range of forty-four to thirty-nine degrees centigrade. The batch was finally cooled to twenty-five degrees centigrade, with agitation. The total time required for the crystallization step was approximately seven hours.

The chlorendic acid crystals were separated from the mother liquor consisting of a monochlorobenzene phase and a water phase by means of a superdehydrator. Each charge of about twenty to twenty-five pounds of wet crystals separated in the superdehydrator was washed first with one to two gallons of monochlorobenzene, and with one to two gallons of water, and discharged to a rotary kiln, where the residual solvents were removed by a current of hot air, and the chlorendic acid crystals finally reached a temperature of eighty-five degrees centigrade, to remove the last of the water of hydration. The yield of dry chlorendic acid was two thousand, four hundred and forty pounds or 93.7 percent of theory. It had a color of thirty-five (Hazen) and a purity of 99.7 percent, and was suitable for the manufacture of high-grade, light-colored polyester resins.

The mother liquor consisted of a water phase, which was separated and discarded, and a monochlorobenzene phase, from which monochlorobenzene was recovered by distillation for re-use in the process. The residue from this distillation was discarded.

Example 15 illustrates the process of this invention applied to a successful commercial operation, and illustrates preferred embodiments of this invention.

The water and organic solvent to be used as a solvent pair in the process of this invention are substantially immiscible in each other, and chlorendic acid will dissolve in them and crystallize out from them on cooling. We have found these organic solvents to be selected from the group consisting of hydrocarbon solvents, halogenated hydrocarbon solvents, ether solvents, ethylacetate, thiophene solvents, organic sulfide solvents, nitroparaffin solvents and mixtures thereof.

Among the water-immiscible hydrocarbon solvents which may be used as alkyl hydrocarbons such as pentane, hexane, kerosene, petroleum ether, mineral spirits and the like; cyclo alkyl hydrocarbons such as cyclohexane, bicycloheptadiene and the like; aromatic hydrocarbons such as benzene, toluene, xylene, diisopropylbenzene, decahydronaphthalene, styrene and the like.

Among the water immiscible halogenated hydrocarbon solvents which may be used are monochlorobenzene, monobromobenzene, iodobenzene, carbon tetrachloride, hexachlorobutadiene, o-chlorobenzotrifluoride, trichloroethylene, tetrachloroethylene, ethylene-dibromide, o-bromotoluene, tetrabromoethane, orthodichlorobenzene, 1,3-bis-trifluoromethylbenzene and the like.

Among the water immiscible solvent ethers which may be used are diisopropylether, diethyl ether, n-butyl ether, methylphenyl ether, vinylisobutyl ether, diallyl ether, di-n-propyl ether, diphenyl ether, vinyl-2-chloroethyl ether and the like.

Among the water immiscible thiophene solvents which may be used are thiophene, monochloro thiophene, dichloro thiophene, trichloro thiophene, tetrachloro thiophene, monobromotrichloro thiophene, dihydrothiophene, and the like.

Among the water immiscible organic sulfide solvents which may be used are benzylchlorobenzyldisulfide, 2, 2',6,6'-tetramethyl-1,4-dithiane and the like.

Among the water immiscible nitroparaffin solvents which may be used are nitromethane, nitroethane and the like.

The examples below further illustrate the organic solvents which can be used with water as the solvent pair in the process of this invention. In each example below chlorendic acid was found to dissolve in the solvent pair consisting of water and the organic solvent or solvents enumerated; and found to crystallize out on cooling:

| Example No. | Solvent pair |
| --- | --- |
| 16 | Water+styrene. |
| 17 | Water+toluene. |
| 18 | Water+xylene. |
| 19 | Water+cyclohexane. |
| 20 | Water+mineral spirits. |
| 21 | Water+diisopropyl benzene. |
| 22 | Water+decahydronaphthalene. |
| 23 | Water+bicycloheptadiene. |
| 24 | Water+kerosene. |
| 25 | Water+Stoddard solvent (1) |
| 26 | Water+mixture of styrene and toluene. |
| 27 | Water+mixture of toluene and monochlorobenzene. |
| 28 | Water+mixture of benzene and toluene. |
| 29 | Water+mixture of benzene and xylene. |
| 30 | Water+mixture of cyclohexane and monochlorobenzene. |
| 31 | Water+mixture of mineral spirits and monochlorobenzene. |
| 32 | Water+mixture of petroleum ether and monochlorobenzene. |

| Example No. | Solvent pair |
|---|---|
| 33 | Water+mixture of diisopropyl benzene mineral spirits, and monochlorobenzene. |
| 34 | Water+mixture of decahydronaphthalene and monochlorobenzene. |
| 35 | Water+mixture of kerosene and monochlorobenzene. |
| 36 | Water+mixture of Stoddard solvent (1) and monochlorobenzene. |
| 37 | Water+hexachlorobutadiene. |
| 38 | Water+p-chlorobenzotrifluoride. |
| 39 | Water+benzotrifluoride. |
| 40 | Water+trichloroethylene. |
| 41 | Water+tetrachloroethylene. |
| 42 | Water+ethylene dibromide. |
| 43 | Water+p-bromotoluene. |
| 44 | Water+tetrabromoethane. |
| 45 | Water+iodobenzene. |
| 46 | Water+orthodichlorobenzene. |
| 47 | Water+1,3-bis-trifluoromethylbenzene. |
| 48 | Water+mixture of hexachlorobutadiene and xylene. |
| 49 | Water+mixture of p-chlorobenzotrifluoride and cyclohexane. |
| 50 | Water+mixture of benzotrifluoride and xylene. |
| 51 | Water+mixture of trichloroethylene and monochlorobenzene. |
| 52 | Water+mixture of tetrachloroethylene and monochlorobenzene. |
| 53 | Water+mixture of tetrabromoethane and monochlorobenzene. |
| 54 | Water+mixture of iodobenzene and mineral spirits. |
| 55 | Water+mixture of monochlorobenzene and o-dichlorobenzene. |
| 56 | Water+mixture of benzene, monochlorobenzene, o-dichlorobenzene, and p-dichlorobenzene. |
| 57 | Water+mixture of 1,3 - bis - trifluoromethylbenzene and monochlorobenzene. |
| 58 | Water+monobromobenzene. |
| 59 | Water+mixture of monobromobenzene and monochlorobenzene. |
| 60 | Water+diisopropyl ether. |
| 61 | Water+diethyl ether. |
| 62 | Water+mixture of diethyl ether and monochlorobenzene. |
| 63 | Water+mixture of diethyl ether, monochlorobenzene and cyclohexane. |
| 64 | Water+methylphenyl ether (anisole). |
| 65 | Water+vinylisobutyl ether. |
| 66 | Water+mixture of diallyl ether and diethyl ether. |
| 67 | Water+mixture of diisopropyl ether and monochlorobenzene. |
| 68 | Water+di-n-propyl ether. |
| 69 | Water+mixture of di-n-propyl ether and diethyl ether. |
| 70 | Water+diphenyl ether. |
| 71 | Water+mixture of diphenyl ether and diethyl ether. |
| 72 | Water+mixture of diphenyl ether, diethyl ether and monochlorobenzene. |
| 73 | Water+vinyl-2-chloroethyl ether. |
| 74 | Water+mixture of vinyl-2-chloroethyl ether and diisopropyl ether. |
| 75 | Water+ethyl acetate. |
| 76 | Water+dichlorothiophene. |
| 77 | Water+trichlorothiophene. |
| 78 | Water+tetrachlorothiophene. |
| 79 | Water+chlorinated mixture of thiophene, monochlorothiophene, dichlorothiophene, and trichlorothiophene. |
| 80 | Water+mixture of trichlorothiophene and thiophene. |
| 81 | Water+mixture of trichlorothiophene, thiophene and monochlorobenzene. |
| 82 | Water+monobromotrichlorothiophene. |
| 83 | Water+mixture of monobromotrichlorothiophene and thiophene. |
| 84 | Water+dihydrothiophene. |
| 85 | Water+mixture of dihydrothiophene and monochlorobenzene. |
| 86 | Water+benzylchlorobenzyldisulfide. |
| 87 | Water+mixture of benzylchlorobenzylsulfide and monochlorobenzene. |
| 88 | Water+2,2',6,6' - tetramethyl - 1,4 - dithiane. |
| 89 | Water+mixture of 2,2',6,6'-tetramethyl-1,4-dithiane and monochlorobenzene. |
| 90 | Water+nitroethane. |
| 91 | Water+mixture of nitroethane and monochlorobenzene. |

(1) Stoddard solvent is a practically odorless, petroleum fraction used as a solvent in the dry-cleaning industry.

Among the preferred solvents used in the process of this invention are benzene, monochlorobenzene, carbon tetrachloride and perchloroethylene. As shown in Example 1, chlorendic acid may be prepared by the condensation of hexachlorocyclopentadiene and maleic anhydride in the presence of monochlorobenzene as solvent. Therefore, the use of a common organic solvent for both the condensation reaction and the crystallization step eliminates the use of two organic solvents in the process and the ensuing more complicated recovery system required for a two solvent process. A preferred organic solvent for both the reaction and the crystallization step is monochlorobenzene.

A preferred crystallization medium is a substantially immiscible solvent pair, containing between about twenty-five and about seventy-five percent by weight of water based on the total weight of solvent medium. When the crystallization medium is seventy-five percent water and twenty-five percent by weight of organic solvent, the loss of organic solvent in the drying step is minimized, and the economics of the process are most beneficial. Since a variety of organic solvents may be used in carrying out the process of this invention without departing from the scope of the invention, it is intended that all matter contained in the above description shall be interpreted as illustrative and not in a limiting sense.

We claim:

1. A process for preparing chlorendic acid which comprises crystallizing said chlorendic acid from solution in a substantially immiscible solvent pair system consisting essentially of water and an organic liquid solvent for chlorendic acid, which solvent is immiscible with water, the water being present in amount at least 25 percent by weight in excess of that theoretically required to hydrolyze chlorendic anhydride to the chlorendic acid present in the mixed solvent pair system, the crystallization being effected by lowering the temperature of the mixed solvent pair system, including dissolved chlorendic acid, to a temperature at which chlorendic acid forms a solid crystalline phase, washing the solid crystals of chlorendic acid with a solvent pair consisting essentially of water and organic liquid solvent for chlorendic acid and separating the chlorendic acid so produced from the washings.

2. A process according to claim 1 in which crystallization of chlorendic acid is promoted by seeding with crystals of chlorendic acid.

3. A process according to claim 1 in which the solvent pair system from which the chlorendic acid is crystallized is water and monochlorobenzene.

4. A process according to claim 3 in which the weight ratio of water to monochlorobenzene in said solvent pair system is between about 3:1 and 1:3.

5. A process according to claim 1 in which the solvent pair system from which the chlorendic acid is crystallized is water and benzene.

6. The process according to claim 1 wherein the solvent pair system from which the chlorendic acid is crystallized is water and a mixture of benzene, monochlorobenzene and dichlorobenzene.

7. The process according to claim 1 wherein the solvent pair system from which the chlorendic acid is crystallized is water and carbon tetrachloride.

8. The process according to claim 1 wherein the solvent pair system from which the chlorendic acid is crystallized is water and perchloroethylene.

9. The process according to claim 1 wherein the solvent pair system from which the chlorendic acid is crystallized is water and mineral spirits.

10. A process for preparing chlorendic acid which comprises crystallizing said chlorendic acid from solution in a substantially immiscible solvent pair system consisting essentially of water and an organic liquid solvent for chlorendic acid, the water being present in amount at least 25 percent by weight in excess of that theoretically required to hydrolyze chlorendic anhydride to the chlorendic acid present in the mixed solvent pair system, the crystallization being effected by lowering the temperature of the mixed solvent pair system, including dissolved chlorendic acid, to a temperature at which chlorendic acid forms a solid crystalline phase, washing the solid crystals of chlorendic acid sequentially with water and an organic liquid solvent for chlorendic acid and separating the chlorendic acid so produced from the washings.

References Cited in the file of this patent

Prill: "Journal American Chemical Soc." vol. 69, page 62, 1947.

Morton: "Laboratory Technique in Organic Chemistry," pages 148–149 (1938).